United States Patent [19]
Lizama et al.

[11] Patent Number: 6,103,204
[45] Date of Patent: *Aug. 15, 2000

[54] SELECTIVE BIOLEACHING OF ZINC

[75] Inventors: Hector M. Lizama, Castlegar; Robert G. Frew, Fruitvale; Cherian C. Abraham, Montrose, all of Canada

[73] Assignee: Cominco Ltd., Vancouver, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/989,180

[22] Filed: Dec. 11, 1997

[51] Int. Cl.$^7$ .............................. C01G 9/00; C22B 19/00
[52] U.S. Cl. ............................................................ 423/109
[58] Field of Search .......................... 423/109, DIG. 17; 435/262

[56] References Cited

U.S. PATENT DOCUMENTS

| | | | |
|---|---|---|---|
| 3,305,353 | 2/1967 | Duncan et al. | 423/DIG. 17 |
| 3,607,235 | 9/1971 | Duncan et al. | 423/DIG. 17 |
| 5,429,659 | 7/1995 | Spencer et al. | 423/DIG. 17 |
| 5,676,733 | 10/1997 | Kohr | 423/DIG. 17 |

FOREIGN PATENT DOCUMENTS

| | | | |
|---|---|---|---|
| 47-14602 | 5/1972 | Japan | 423/DIG. 17 |
| WO 94/28184 | 12/1994 | WIPO . | |

OTHER PUBLICATIONS

Chaudhury, et al., "Kinetics of Bio–Chemical Leaching . . . " Metallurgical Trans B, vol. 16B, pp. 667–70, Dec. 1985.
Tuovinen, et al., "Use of Micro–Organisms for the Recovery of Metals" International Metallurgical Rev. vol. 19, pp. 21–30, 1974.
Krafft, et al., "Bacterial leaching of two Swedish zinc sulfide ores", FEMS Microbiol. Rev., 11(1–3), pp. 121–7, 1993.
Lizama et al., "Interaction of chalcopyrite . . . ", Can. J. Microbiol., 37(4), pp. 304–11, 1991.
1. Paper entitled Bio–Oxidation of a Complex Zinc Sulphide Ore: a Study Performed in Continuous Bench and Pilot Scale. By Sandstrom, A.S., Sundkvist, J.E., Petersson, S. 1997, no month Paper No. M1.1 IBS Biomine '97 Conference Proceedings, Australian Mineral Foundation, Glenside, SA, Australia.
2. Paper entitled Bacterial Leaching of a Sulphide Ore by Thiobacillus Ferrooxidans and Thiobacillus Thiooxidans: 1. Shake flask experiments. By Lizama, H.M., Suzuki I. 1 1988, no month, Biotechnology and Bioengineering, vol. 32, pp. 110–116.
3. Paper entitled Bacterial Leaching of a Sulphide Ore by Thiobacillus Ferrooxidans and Thiobacillus Thiooxidans, Part II: Column leaching studies. By Lizama, H.M., Suzuki, I. 1989, no month, Hydrometallurgy, vol. 22, pp. 301–310.

*Primary Examiner*—Steven Bos
*Attorney, Agent, or Firm*—Elbie R. de Kock

[57] ABSTRACT

A method of selectively leaching zinc from a source material containing zinc in sulphide form and iron, comprises the steps of subjecting the source material to bioleaching with a strict sulphur oxidizing micro organism or a mixed culture of sulphur oxidizing and iron oxidizing micro organisms, in the presence of a nutrient solution containing less than about 15 mg/L phosphate ions. In another embodiment, the source material is in the form of a slurry having a solids concentration of at least about 25% on a weight per volume basis and a nutrient solution containing from about 1 mg/L to less than about 100 mg/L ammonium ions, from about 0.5 mg/L to less than about 40 mg/L magnesium ions and from about 2 mg/L to less than about 60 mg/L phosphate ions.

58 Claims, 1 Drawing Sheet

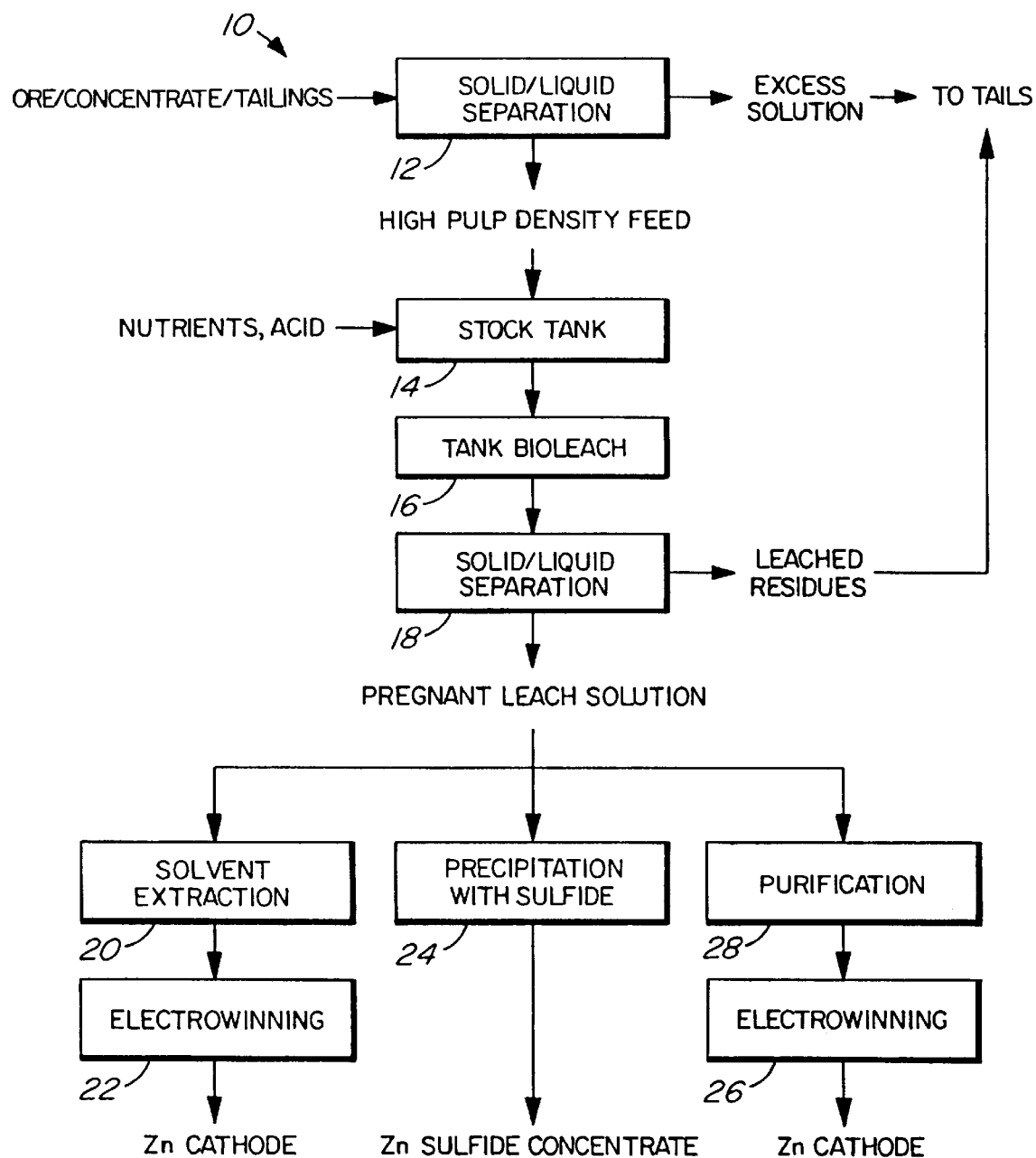

SELECTIVE BIOLEACHING OF ZINC

FIELD OF THE INVENTION

This invention relates to the selective bioleaching of zinc from a source material which contains zinc in sulphide form, such as sphalerite (ZnS), as well as iron. The source material may include ores, minerals, concentrates, tailings or residues. The source material may also include complex minerals or ore deposits which are crushed or ground into finer particles to facilitate the treatment thereof.

BACKGROUND OF THE INVENTION

In proposed bioleaching processes for the extraction of zinc from zinc concentrates, such as described in Australian Patent No. 673,929 and International Patent Application WO 94/28184, both zinc and iron are solubilized during the bioleaching process, resulting in a solution of zinc and iron from which the zinc must then be separated.

The conventional thinking in the mining industry is that the leaching of zinc from a zinc sulphide source material requires the presence of ferric iron in solution to liberate zinc ions from the sulphide mineral lattice, according to:

$$ZnS+2Fe^{3+} \rightarrow Zn^{2+}+S^{0}+2Fe^{2+}$$

The ferric iron which is reduced to ferrous iron in the above process, is then regenerated to the ferric form by bacterial action.

Thus, in presently proposed zinc bioleaching processes, ferric iron is produced in solution along with zinc, which as indicated above, is considered to be a necessary requirement for effectively carrying out the process. The iron being produced in solution must then be removed in a subsequent precipitation step, prior to zinc electrowinning.

The generation of dissolved iron during bioleaching of zinc from a sulphide mineral source material, poses a number of problems in any integrated bioleach circuit:

(1) biooxidation activity is wasted since iron is being leached instead of valuable zinc;

(2) dissolved iron in ferrous form will inevitably oxidize to ferric and subsequently either oxidize other sulfides or precipitate as a jarosite in a hydrolytic reaction which produces acid; and (3) dissolved iron, especially the ferric form, has a high affinity for zinc-complexing solvent extraction reagents, thus jeopardizing zinc concentration and recovery.

It is accordingly an object of the present invention to provide a bioleaching process that is selective for zinc relative to iron, whereby the extraction of iron into the leach solution is minimized.

SUMMARY OF THE INVENTION

According to the invention, there is provided a method of selectively leaching zinc from a source material containing zinc in sulphide form and iron, comprising the steps of subjecting the source material to bioleaching with a strict sulphur oxidizing micro organism in the presence of a nutrient solution containing less than about 15 mg/L phosphate ions. The source material may be in the form of a slurry having a solids concentration of from about 20% to about 80%, preferably about 25% to about 50%, by weight per volume, or alternatively the source material may comprise a wet feed material having a solids content of at least 1% by weight.

In this specification a "strict sulphur oxidizing micro organism" means a micro organism which oxidizes inorganic sulphur compounds, such as sulphide and elementary sulphur to sulphuric acid but is not capable of oxidizing ferrous iron. One example of such a micro organism is Thiobacillus thiooxidans.

According to another aspect of the invention there is provided a method of selectively bioleaching zinc from a source material in slurry form, containing zinc in sulphide form and iron, comprising the steps of subjecting the source material to bioleaching with a strict sulphur oxidizing micro organism in the presence of a nutrient solution containing from about 1 mg/L to less than about 100 mg/L ammonium ions, from about 0.5 mg/L to less than about 40 mg/L magnesium ions and from about 2 mg/L to less than about 60 mg/L phosphate ions, wherein the slurry has a solids concentration of at least about 25% on a weight per volume basis. The solids concentration is preferably from about 30% to about 50% weight per volume.

The ammonium ions may be present as ammonium sulphate in solution and the magnesium ions may be present as magnesium sulphate ($MgSO_4.7H_2O$) in solution. The concentration of the ammonium sulphate may be from about 5 mg/L to less than about 400 mg/L, preferably about 5 mg/L to about 100 mg/L and most preferably from about 5 mg/L to about 10 mg/L. The magnesium sulphate concentration may be from about 5 mg/L to less than about 400 mg/L, preferably from about 5 mg/L to about 200 mg/L and most preferably from about 5 mg/L to about 50 mg/L. The phosphate ion concentration is preferably about 2 mg/L to about 15 mg/L and most preferably from about 2 mg/L to about 10 mg/L.

Further according to the invention there is provided a method of selectively leaching zinc from a source material containing zinc in sulphide form and iron, comprising the steps of subjecting the source material to bioleaching with a strict sulphur oxidizing micro organism in the presence of a nutrient solution containing from about 1 mg/L to less than about 100 mg/L ammonium ions, from about 0.5 mg/L to less than about 40 mg/L magnesium ions and from about 2 mg/L to less than about 60 mg/L phosphate ions wherein the bioleaching is carried out at a pH of from above about 2.5 to about 6.5.

Also according to the invention there is provided a method of selectively bioleaching zinc from a source material containing zinc in sulphide form and iron, comprising the steps of subjecting the source material to bioleaching with a mixed culture of a strict sulphur oxidizing micro organism and an iron oxidizing micro organism and enhancing sulphur oxidation activity and minimizing iron oxidation activity by effecting the bioleaching in the presence of a nutrient solution containing about 5 mg/L to less than about 400 mg/L ammonium sulphate, about 5 mg/L to less than about 400 mg/L magnesium sulphate and about 2 mg/L to less than about 60 mg/L phosphate ions at a pH in the range of from about 0.5 to about 6.5.

Further objects and advantages of the invention will become apparent from the description of preferred embodiments of the invention below.

BRIEF DESCRIPTION OF THE DRAWINGS

The accompanying drawing is a flow diagram of a zinc selective bioleaching process according to the invention.

DETAILED DESCRIPTION OF PREFERRED EMBODIMENT

An embodiment of the invention will now be described with reference to the recovery of residual zinc metal values from the flotation tailings of a zinc mine.

In the drawing, reference numeral 10 generally indicates a process for the selective bioleaching of zinc.

In practice, the tailings can be transported as a slurry from an operating mine mill or from a dredging device at a tailings dam proper.

The tailings slurry is concentrated in a thickener, as indicated at 12, so as to attain the desired pulp density of about 50% on a weight per volume basis. The high density pulp is then stored in a stirred stock tank 14.

The pulp is next introduced into a conventional bio oxidation circuit 16 which may comprise either a single tank reactor or an array of tank reactors. The bio oxidation circuit 16 may be located on site at the mine, where the slurry is produced, or at a different location. Instead of using tanks, the bioleaching may be carried out by any suitable method, such as in conventional vats or in a tailings pond.

Bioleaching is carried out using a mixed culture of Thiobacillus thiooxidans and Thiobacillus ferrooxidans. Nutrients are added to the pulp as the feed stream enters the reactor tank or the first tank of a series of tanks. In this example the leach solution comprises about 7 mg/L ammonium sulphate, about 12 mg/L magnesium sulphate ($MgSO_4 \cdot 7H_2O$) and about 2 mg/L phosphate ions, which may be introduced as $K_2HPO_4$.

During the bioleaching step, either acid or base is added in order to maintain the pH in the desired range of about 2.3 to about 2.7. After the bioleaching step, the resultant slurry is subjected to a liquid/solid separation, as indicated at 18, to separate the pregnant zinc leach solution from the spent residue, which is returned to the tailings pond.

The pregnant leach liquor is subjected to further treatment for the recovery of zinc therefrom.

One option is to subject the leach liquor to solvent extraction, as indicated at 20, followed by electrowinning 22.

Another option is to precipitate the zinc as sulphide with hydrogen sulphide, as indicated at 24, or by direct electrowinning 26, after a purification step 28, which comprises precipitation of impurities by the addition of zinc dust.

In another application the process material may comprise zinc sulphide ore, which is subjected to grinding and froth flotation, if desired, to form a slurry. The slurry can then be introduced into the bioleach circuit 16, indicated above.

Another application of the process is in the heap leaching of ore. The ore is crushed to the desired size and agglomerated with acid solution in a rotating drum.

The acid agglomerate is then transferred to a leach pad and piled into a heap to a desired height. The heap is then irrigated by the leach solution. The resulting zinc laden pregnant leach solution exiting from the bottom of the heap is subjected to further processing for zinc recovery, as described above.

Various tests were carried out on a tailings sample containing 3.3% zinc and 5.5% iron which were bioleached at a pH of about 2.5 and a temperature of about 25° C. in shaking flasks. The media used in the tests are as follows:
  Medium 1: a conventional medium containing 400 mg/L ammonium sulphate; 400 mg/L magnesium sulphate ($MgSO_4 \cdot 7H_2O$) and 100 mg/L phosphate ions.
  Medium 2: a more dilute medium containing 66 mg/L ammonium sulphate; 123 mg/L magnesium sulphate and 19 mg/L phosphate ions.
  Medium 3: a very dilute medium containing 7 mg/L ammonium sulphate; 12 mg/L magnesium sulphate and 2 mg/L phosphate ions.

The zinc selectivity is calculated as follows:

$$\text{Zn selectivity} = \frac{a}{b};$$

$$\text{where } a = \left[\frac{g/L \text{ Zn in leach solution}}{\% \text{ Zn in feed material}}\right]$$

$$\text{and } b = \left[\frac{g/L \text{ Fe in leach solution}}{\% \text{ Fe in feed material}}\right]$$

One of the tests was carried out using the iron oxidizing micro organism, Thiobacillus ferroxidans, in medium 1 and another test using the strict sulphur oxidizing micro organism, Thiobacillus thiooxidans, also in medium 1. The results are set out in the table below:

|  | T. ferrooxidans (medium 1) | T. thiooxidans (medium 1) |
| --- | --- | --- |
| Fe (mg/L) | 3600 | 1510 |
| Zn (mg/L) | 2340 | 2100 |
| Zn selectivity | 1.08 | 2.32 |

The results indicate that zinc selectivity is better with Thiobacillus thiooxidans than with Thiobacillus ferroxidans.

The following tests were carried out using a mixed culture of Thiobacillus thiooxidans and Thiobacillus ferrooxidans. The mixed cultures were prepared by adding equal amounts of Thiobacillus thiooxidans and Thiobacillus ferrooxidans. Standard microbiological culturing methods were used to isolate the strains from an active tailings pond for use in the tests.

The tests were carried out using the different the nutrient media described above and at different pulp densities.

The results are set out in the following tables. The pulp densities, in percentage weight per volume, are indicated with the suffix "PD".

|  | 5% PD | 10% PD | 20% PD | 25% PD | 30% PD |
| --- | --- | --- | --- | --- | --- |
| Medium 1 |  |  |  |  |  |
| Fe (mg/L) | 3380 | 6790 | 12900 | 12970 | 11600 |
| Zn (mg/L) | 2015 | 4300 | 8800 | 9430 | 9280 |
| Zn selectivity | 0.99 | 1.06 | 1.14 | 1.21 | 1.33 |
| Medium 2 |  |  |  |  |  |
| Fe (mg/L) | 3490 | 4730 | 4350 | 4900 | 4420 |
| Zn (mg/L) | 2200 | 4350 | 7600 | 9680 | 10060 |
| Zn selectivity | 1.05 | 1.53 | 2.91 | 3.29 | 3.79 |

|  | 5% PD | 10% PD | 20% PD | 50% PD |
| --- | --- | --- | --- | --- |
| Medium 3 |  |  |  |  |
| Fe (mg/L) | 165 | 225 | 185 | 250 |
| Zn (mg/L) | 790 | 1370 | 2840 | 4380 |
| Zn selectivity | 7.98 | 10.15 | 25.59 | 29.20 |

From the above it is clear that zinc selectivity is greatly enhanced by operating at a higher pulp density using a more dilute nutrient solution.

Tests were also carried out on the tailings sample at different temperatures using the very dilute medium 3. The results, set out in the table below, show that zinc selectivity is enhanced at higher temperatures.

| (medium 3) | 30° C. | 35° C. | 40° C. | 45° C. |
|---|---|---|---|---|
| Fe (mg/L) | 410 | 340 | 395 | 350 |
| Zn (mg/L) | 5600 | 5650 | 6290 | 6580 |
| Zn selectivity | 22.76 | 27.70 | 26.54 | 31.33 |

Although zinc selectivity is better with Thiobacillus thiooxidans alone, as indicated by the first set of tests above, the use of non-sterile sulphide mineral feed will result in contamination with Thiobacillus ferroxidans in regular plant practice. Therefore, the method according to the invention provides for the use of a mixed culture of both a strict sulphur oxidizing micro organism and an iron oxidizing micro organism but providing conditions for a zinc bioleach operation to be performed as if the only active micro organism present is Thiobacillus thiooxidans. Thus, the effect is that sulphur oxidation activity is enhanced and iron oxidation activity is minimized.

While only preferred embodiments of the invention have been described herein in detail, the invention is not limited thereby and modifications can be made within the scope of the attached claims.

What is claimed is:

1. A method of selectively bioleaching zinc from a source material containing zinc in sulphide form and iron, comprising the steps of:
    subjecting the source material to bioleaching with a strict sulphur oxidizing micro organism in the presence of a dilute nutrient solution containing 7 mg/L ammonium sulphate, 12 mg/L magnesium sulphate and 2 mg/L phosphate ions.
2. The method according to claim 1, wherein the source material is in the form of a slurry having a solids concentration of from about 20% to about 80% on a weight per volume basis.
3. The method according to claim 2, wherein the solids concentration is from about 25% to about 50% weight per volume.
4. The method according to claim 1, wherein the source material comprises a wet feed material having a solids content of at least 1% by weight.
5. The method according to claim 1, wherein the bioleaching is effected at a temperature of from about 5° C. to about 95° C.
6. The method according to claim 5, wherein the bioleaching is effected at a temperature of from about 15° C. to about 55° C.
7. The method according to claim 6, wherein the bioleaching is effected at a temperature of from about 25° C. to about 45° C.
8. The method according to claim 7, wherein the bioleaching is effected at a temperature of from about 35° C. to about 40° C.
9. The method according to claim 1, wherein the bioleaching is effected at a pH of up to about 6.5.
10. The method according to claim 9, wherein the bioleaching is effected at a pH of from about 0.5 to about 4.0.
11. The method according to claim 10, wherein the bioleaching is effected at a pH of from about 2.3 to about 4.0.
12. The method according to claim 11, wherein the bioleaching is effected at a pH of from about 2.3 to about 2.7.
13. The method according to claim 1, wherein the nutrient solution contains dissolved oxygen in the range of from about 0.5 mg/L to about 10 mg/L.
14. The method according to claim 13, wherein the nutrient solution contains dissolved oxygen in the range of from about 1 mg/L to about 8 mg/L.
15. The method according to claim 10, wherein the nutrient solution contains dissolved oxygen in the range of from about 2 mg/L to about 8 mg/L.
16. The method according to claim 11, wherein the nutrient solution contains dissolved oxygen in the range of from about 5 mg/L to about 8 mg/L.
17. The method according to claim 1, wherein the sulphur oxidizing micro organism comprises Thiobaccillus thiooxidans.
18. The method according to claim 1, wherein the bioleaching is carried out with a mixed culture comprising a strict sulphur oxidizing micro organism and a metal oxidizing micro organism.
19. The method according to claim 18, wherein the bioleaching is carried out with a mixed culture of a Thiobacillus thiooxidans strain and a Thiobacillus ferrooxidans strain.
20. A method of selectively bioleaching zinc from a source material in slurry form, containing zinc in sulphide form and iron, comprising the steps of:
    subjecting the source material to bioleaching with a strict sulphur oxidizing micro organism in the presence of a nutrient solution containing from 1.9 mg/L to less than 18 mg/L ammonium ions, from 1.2 mg/L to less than 12 mg/L magnesium ions and from 2 mg/L to 15 mg/L phosphate ions, wherein the slurry has a solids concentration of at least 25% on a weight per volume basis.
21. The method according to claim 20, wherein the solids concentration is from about 30% to about 50% weight per volume.
22. The method according to claim 20, wherein the nutrient solution contains from about 1 mg/L to about 3 mg/L ammonium ions.
23. The method according to claim 20, wherein the nutrient solution contains from about 0.5 mg/L to about 5 mg/L magnesium ions.
24. The method according to claim 20, wherein the nutrient solution contains from 2 mg/L to about 10 mg/L phosphate ions.
25. The method according to claim 20, wherein the bioleaching is effected at a pH of up to about 6.5.
26. The method according to claim 25, wherein the bioleaching is effected at a pH of from about 2.3 to about 4.0.
27. The method according to claim 26, wherein the bioleaching is effected at a pH of from about 2.3 to about 2.7.
28. The method according to claim 20, wherein the sulphur oxidizing micro organism comprises Thiobacillus thiooxidans.
29. The method according to claim 20, wherein the bioleaching is carried out with a mixed culture comprising a strict sulphur oxidizing micro organism and a metal oxidizing micro organism.
30. The method according to claim 28, wherein the bioleaching is carried out with a mixed culture of a Thiobacillus thiooxidans strain and a Thiobacillus ferrooxidans strain.
31. The method according to claim 20, wherein the ammonium ions are present in the form of ammonium sulphate in solution.
32. The method according to claim 20, wherein the magnesium ions are present in the form of magnesium sulphate in solution.

33. The method according to claim 20, wherein the nutrient solution contains 2 mg/L phosphate ions.

34. A method of selectively bioleaching zinc from a source material containing zinc in sulphide form and iron, comprising the steps of:
subjecting the source material to bioleaching with a strict sulphur oxidizing micro organism in the presence of a nutrient solution containing from 1.9 mg/L to less than 18 mg/L ammonium ions, from 1.2 mg/L to less than 12 mg/L magnesium ions and from 2 mg/L to 15 mg/L phosphate ions, wherein the bioleaching is carried out at a pH of from above 2.5 to 6.5.

35. The method according to claim 34, wherein the pH is from above 2.5 to about 4.0.

36. The method according to claim 34, wherein the pH is from above 2.5 to about 2.7.

37. The method according to claim 34, wherein the source material is in the form of a slurry having a solids concentration of at least about 20% on a weight per volume basis.

38. The method according to claim 37, wherein the solids concentration is from about 25% to about 50% weight per volume.

39. The method according to claim 34, wherein the nutrient solution contains from 1.9 mg/L to about 3 mg/L ammonium ions.

40. The method according to claim 34, wherein the nutrient solution contains from 1.2 mg/L to about 5 mg/L magnesium ions.

41. The method according to claim 34, wherein the nutrient solution contains from 2 mg/L to about 10 mg/L phosphate ions.

42. The method according to claim 34, wherein the sulphur oxidizing micro organism comprises Thiobacillus thiooxidans.

43. The method according to claim 34, wherein the bioleaching is carried out with a mixed culture comprising a strict sulphur oxidizing micro organism and a metal oxidizing micro organism.

44. The method according to claim 43, wherein the bioleaching is carried out with a mixed culture of a Thiobacillus thiooxidans strain and a Thiobacillus ferrooxidans strain.

45. The method according to claim 34, wherein the ammonium ions are present in the form of ammonium sulphate in solution.

46. The method according to claim 34, wherein the magnesium ions are present in the form of magnesium sulphate in solution.

47. The method according to claim 34, wherein the nutrient solution contains 2 mg/L phosphate ions.

48. A method of selectively bioleaching zinc from a source material containing zinc in sulphide form and iron, comprising the steps of:
subjecting the source material to bioleaching with a mixed culture of a strict sulphur oxidizing micro organism and an iron oxidizing micro organism; and
enhancing sulphur oxidation activity and minimizing iron oxidation activity by effecting the bioleaching in the presence of a nutrient solution containing 7 mg/L to less than 66 mg/L ammonium sulphate, from 12 mg/L to less than 123 mg/L magnesium sulphate ($MgSO_4.7H_2O$) and 2 mg/L to 15 mg/L phosphate ions at a pH in the range of from above 2.5 to 6.5.

49. The method according to claim 42, wherein the source material is in the form of a slurry having a solids concentration of at least about 20% on a weight per volume basis.

50. The method according to claim 49, wherein the solids concentration is from about 25% to about 50% weight per volume.

51. The method according to claim 48, wherein the ammonium sulphate concentration is from 7 mg/L to about 10 mg/L.

52. The method according to claim 48, wherein the magnesium sulphate concentration is from 12 mg/L to about 50 mg/L.

53. The method according to claim 48, wherein the phosphate ion concentration is from 2 mg/L to about 10 mg/L.

54. The method according to claim 48, wherein the pH is from above 2.5 to about 4.0.

55. The method according to claim 54, wherein the pH is from above 2.5 to about 3.5.

56. The method according to claim 41, wherein the bioleaching is effected at a pH of from above 2.5 to about 2.7.

57. The method according to claim 48, wherein the strict sulphur oxidizing micro organism comprises a Thiobacillus thiooxidans strain and the iron oxidizing micro organism comprises a Thiobacillus ferrooxidans strain.

58. The method-according to claim 48, wherein the nutrient solution contains 2 mg/L phosphate ions.

* * * * *